US007952070B2

(12) United States Patent
Senko et al.

(10) Patent No.: US 7,952,070 B2
(45) Date of Patent: May 31, 2011

(54) INTERLACED Y MULTIPOLE

(75) Inventors: Michael W. Senko, Sunnyvale, CA (US); Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 221 days.

(21) Appl. No.: 12/352,262

(22) Filed: Jan. 12, 2009

(65) Prior Publication Data

US 2010/0176295 A1 Jul. 15, 2010

(51) Int. Cl.
*H01J 49/00* (2006.01)
*B01D 59/44* (2006.01)

(52) U.S. Cl. ........................................ 250/292; 250/281

(58) Field of Classification Search .................. 250/281, 250/282, 288, 292, 396 R
See application file for complete search history.

(56) References Cited

U.S. PATENT DOCUMENTS 5,468,958 A * 11/1995 Franzen et al. ............... 250/292
5,825,026 A * 10/1998 Baykut ......................... 250/292
6,417,511 B1 * 7/2002 Russ et al. .................... 250/292
6,596,989 B2 7/2003 Kato
6,697,340 B2 2/2004 Christie et al.
6,891,157 B2 5/2005 Bateman et al.
6,950,072 B2 9/2005 Miyata et al.
6,956,205 B2 10/2005 Park
6,979,816 B2 * 12/2005 Tang et al. .................... 250/292
7,049,580 B2 * 5/2006 Londry et al. ................ 250/292
7,067,802 B1 * 6/2006 Kovtoun ....................... 250/292
7,196,326 B2 * 3/2007 Franzen et al. ............... 250/292
7,351,961 B2 4/2008 Malek et al.
7,358,488 B2 4/2008 Chernushevich et al.
7,372,042 B2 5/2008 Mordehai et al.
7,420,161 B2 9/2008 Kovtoun
7,459,678 B2 12/2008 Schoen
2003/0052269 A1 * 3/2003 Apffel et al. .................. 250/288
2004/0069943 A1 * 4/2004 Kato ............................. 250/292
2007/0057178 A1 * 3/2007 Chernushevich et al. .... 250/292
2008/0061227 A1 * 3/2008 Kovtoun ....................... 250/292
2008/0315086 A1 * 12/2008 Kovtoun ....................... 250/290
2009/0090853 A1 * 4/2009 Schoen et al. ................ 250/292

FOREIGN PATENT DOCUMENTS

WO WO 2004/023516 A1 3/2004

* cited by examiner

*Primary Examiner* — Robert Kim
*Assistant Examiner* — Brooke Purinton
(74) *Attorney, Agent, or Firm* — Michael C. Staggs

(57) ABSTRACT

A method and apparatus of combining two independent multipoles in an interlaced fashion to form a resultant multipole structure is introduced. Such an arrangement enables ions from two separate sources to be merged along a predetermined longitudinal direction but also enables in the reverse path, predetermined portions of ions from a single source to be directed along one or more ion channel paths to also enable, for example, simultaneous collection by a Time of Flight (TOF) mass analyzer and an ion trap.

31 Claims, 8 Drawing Sheets

INTERLACED Y MULTIPOLE

BACKGROUND OF THE INVENTION

1. Field of the Invention

The present invention relates to the field of mass spectrometry, and more particularly to a mass spectrometer multipole device that enables the merging of ion beams from separate sources and/or for directing a single ion beam into a plurality of directions for collection and/or analysis.

2. Discussion of the Related Art

Mass spectrometry is an analytical technique that enables the identification of chemical compositions of a sample based on the mass-to-charge ratio of charged particles. Generally, analytes in a sample are ionized and thereafter separated via their mass wherein the ratio of a respective charge to mass is determined by passing them through electric and magnetic fields so as to result in a desired mass spectrum.

In particular, the design of a mass spectrometer to enable separation and detection most often includes: an ion source to transform introduced molecules in a sample into ionized particles; an analyzer to separate such ionized particles by their masses by applying electric and magnetic fields; and a detector to measure and thus provide data for calculating the abundances of each ion present.

As known to those skilled in the art, in the design of such a spectrometer system, the ionized particles resulting from the ion source are often directed along an ion path using ion steering optics, such as, but not limited to cylindrical lenses, einzel structures, skimmers, and multipole rod configurations, etc. In the multipole rod configuration, the number of rods can be any even number, such as four, six, or eight with high-frequency voltages having inverted phases applied to electrodes adjacent to each and often in electrical cooperation with additionally applied direct current (DC) voltages. Accordingly, ions introduced along a longitudinal direction into such structures proceed by oscillation in a predetermined cycle due to a high frequency electric field caused by the aforementioned voltages so as to direct a desired amount of ions to a subsequent stage.

While such ion steering optics, and in particular, the mutipole rod configurations, beneficially enable the desired ions to be directed along predetermined paths, such designs do not provide for the merging of ion beams from two distinct sources, or for redirecting a single ion beam in one direction or another as disclosed by the novel and beneficial configurations of the present invention.

To give the reader an idea of the technical capabilities presently in the field, one can look to background information for a system that uses movably mounted multipoles to couple one or more ion sources to a mass spectrometer, which is described and claimed in U.S. Pat. No. 5,825,026, entitled "Introduction of Ions from Ion sources Into Mass Spectrometers," issued Oct. 20, 1998, to Baykut, including the following, "The basic idea of the invention is to movably position one or several curved multipole ion guides, so that in a system of multiple stationary ion sources, each source can be used one after another by adjusting the movable multipole. The ions originating from various ion sources, which however are directed toward a common point, can be introduced into the mass spectrometer, using a rotatable multipole ion guide arrangement. The ions can be transferred directly into an rf ion trap or into a quadrupole or sector mass spectrometer, or also an ion transfer line of a FTICR spectrometer. For this purpose, a multipole (e.g. a hexapole or octopole) is positioned adjustably around the axis of the ion trap or around of the axis of the ion transfer path of the FTICR mass spectrometer. The curved longitudinal axis of the multipole on the mass spectrometer side (injection side) is identical to the rotation axis of the rotatably positioned multipole. During a rotation, the other end of the multipole moves in a circle passing various ion sources. The rotation position of the multipole determines from which ion source the ions are transferred into the mass spectrometer."

Moreover, background information for a system that utilizes a deflecting means to steer ions produced from a plurality of ion sources to a mass spectrometer, is described and claimed in U.S. Pat. No. 6,596,989 B2, entitled, "Mass Analysis Method and Apparatus for Mass Analysis," issued Jul. 22, 2003, to Kato, including the following, "A mass analysis system is capable of performing a plurality of measurements in parallel by mounting a plurality of ion sources onto one mass spectrometer and speedily switching the ion sources. The mass analysis apparatus comprises a plurality of ion sources; and a deflecting means for deflecting ions from at least one ion source among the plurality of ions sources so that the ions travel toward the mass spectrometer by producing an electric field."

Background information for an ion funnel to merge ions is described and claimed in U.S. Pat. No. 6,979,816 B2, entitled, "Multi-Source Ion Funnel," issued Dec. 27, 2005, to Tang et al., including the following, "A method for introducing ions generated in a region of relatively high pressure into a region of relatively low pressure by providing at least two electrospray ion sources, providing at least two capillary inlets configured to direct ions generated by the electrospray sources into and through each of the capillary inlets, providing at least two sets of primary elements having apertures, each set of elements having a receiving end and an emitting end, the primary sets of elements configured to receive a ions from the capillary inlets at the receiving ends, and providing a secondary set of elements having apertures having a receiving end and an emitting end, the secondary set of elements configured to receive said ions from the emitting end of the primary sets of elements and emit said ions from said emitting end of the secondary set of elements. The method may further include the step of providing at least one jet disturber positioned within at least one of the sets of primary elements, providing a voltage, such as a dc voltage, in the jet disturber, thereby adjusting the transmission of ions through at least one of the sets of primary elements."

Background information on a branched device to alternatively direct ions is described and claimed in U.S. Pat. No. 7,420,161 B2, entitled "Branched Radio Frequency Multipole," issued Sep. 2, 2008, to Kovtoun, including the following, "Systems and methods of the invention include a branched radio frequency multipole configured to act, for example, as an ion guide. The branched radio frequency multipole comprises multiple ion channels through which ions can be alternatively directed. The branched radio frequency multipole is configured to control which of the multiple ion channels ions are directed, through the application of appropriate potentials. Thus, ions can alternatively be directed down different ion channels without the use of a mechanical valve."

Additional background information for a system that uses an electrical lens to merge ion beams, is described and claimed in U.S. Pat. No. 7,372,042 B2, entitled "Lens Device For Introducing A Second Ion Beam Into a Primary Ion Path," issued May 13, 2008, to Mordehai et al., including the following, "The invention provides a device for introducing a second ion beam into the primary ion path of a mass spectrometry system. In general, the device contains an electrical lens having a primary ion passageway and a secondary ion passageway that merges with the primary ion passageway. In certain embodiments, the electrical lens contains a first part and a second part that, together, form the primary ion passageway. The first part of the lens may contain the secondary ion passageway. A device for delivering ions to a mass analyzer and a mass spectrometer system containing the subject electric lens are also provided. Also provided by the invention are methods for introducing a second ion beam into a primary ion path using the subject electric lens, and methods of sample analysis."

Finally, background information for a system that interfaces one or more ion sources via multipole rod configurations, is described and claimed in U.S. Pat. No. 7,358,488 B2, entitled "Mass Spectrometer Multiple Device Interface For Parallel Configuration of Multiple Devices," issued Apr. 15, 2008, to Chernushevich et al., including the following, "A multi-device interface for use in mass spectrometry for interfacing one or more ion sources to one or more downstream devices. The multi-device interface comprises three or more multipole rod sets configured as either an input rod set or an output rod set depending on potentials applied to the multipole rod sets. The multipole rod sets configured as an input rod set are connectable to the one or more ion sources for receiving generated ions therefrom and sending the ions to at least one multipole rod set configured as an output multipole rod set. The output multipole rod sets are connectable to a downstream device for sending the generated ions thereto. At least two of the multipole rod sets are configured as input rod sets or at least two of the multipole rod sets are configured as output rod sets."

Accordingly, while the above described inventions have beneficial applications, a large customer need exists for a mass spectrometer system that utilizes multipole ion optics in a novel interlaced configuration, as disclosed herein, which can not only merge ion beams from two separate sources but can also be used to direct a single ion beam into a plurality of desired directions. The present invention is thus directed to such a need.

SUMMARY OF THE INVENTION

Accordingly, the present invention provides for an interlaced ion guide apparatus to enable ions from two separate sources to be merged along a predetermined longitudinal direction for collection and/or analysis but also enables in the reverse path, predetermined ions to be sequentially directed along a selected ion channel to also enable, for example, collection and/or analysis by predetermined downstream instruments.

As another aspect of the present invention, there is provided a mass spectrometer system that incorporates the aforementioned interlaced ion guide apparatus to enable the merging of produced ions or if desired to direct ions produced from a desired ion source sequentially to a pair of predetermined downstream instruments.

In accordance with another aspect, as disclosed herein, the present invention provides for a method of operating a mass spectrometer having an interlaced rod set, that includes: receiving ions within an interlaced set of ion guide electrodes; the interlaced set of electrodes being configured from a first and a second set of ion guide electrodes that respectively defines a first and a second ion channel path; providing an RF field within the first and the second set of ion guide electrodes to radially confine the desired ions within the first and the second ion channel paths; and providing a DC voltage gradient to induce DC axial forces that act on the received ions so that the received ions can be sequentially directed along either of the first ion channel or the second ion channel paths.

In accordance with a final aspect of the present invention, there is provided a method of operating a mass spectrometer having an interlaced ion guide rod set that includes: receiving ions within a first and a second set of ion guide electrodes interlaced to provide for a resultant multipole ion channel; wherein the first and said second ion channels further define a first and a second ion channel path; providing an RF field to radially confine the desired received ions within the first and the second ion channel paths; and providing a DC voltage gradient to induce DC axial forces that act on the received ion so that the received ions can be directed to the resultant multipole ion channel.

Accordingly, the present invention provides for an apparatus that combines two independent sets of electrodes (i.e., multipoles) in an interlaced fashion to form a resultant multipole structure. In such a novel structure, ions originating from different sources can be measured for separate or conjunctive ion calibration and/or (m/e) ion analysis without the cost of ion source switching inefficiency. Additionally, by operating the Y-multipole device of the present invention in a reverse mode enables produced ions to be sequentially directed to one or more downstream analyzing instruments also without the cost of analyzing switching inefficiency.

DETAILED DESCRIPTION

Figure 1:
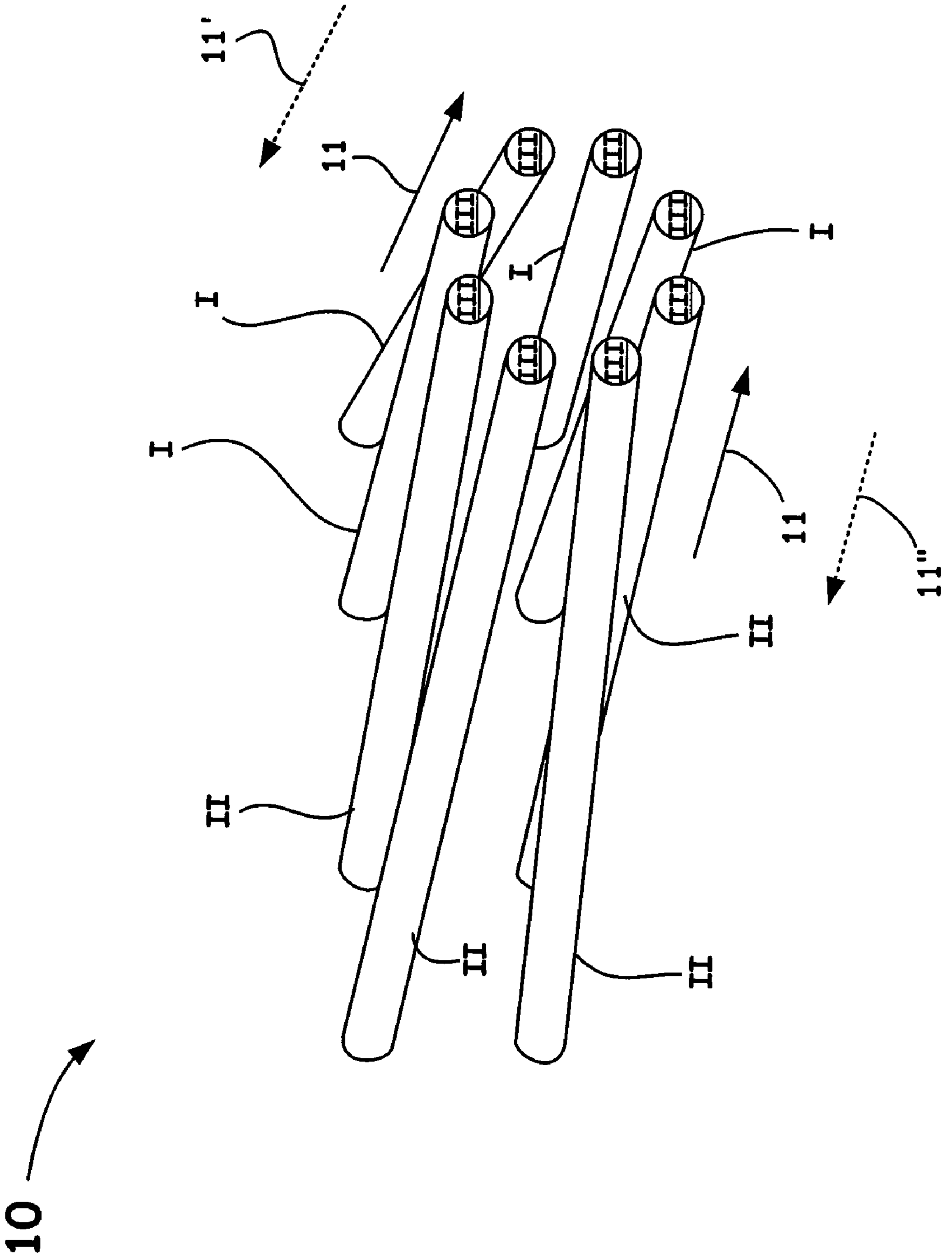
FIG. 1 shows an example Y-multipole device of the present invention having straight electrodes.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

In addition, unless otherwise indicated, numbers expressing quantities of ingredients, constituents, reaction conditions and so forth used in the specification and claims are to be understood as being modified by the term "about" Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention is directed to a Y-multipole apparatus and method approach designed to merge ion beams from at least two separate ion sources or as another beneficial arrangement, direct a single ion beam source into separate optical paths to enable collection and/or manipulation by one or more desired mass to charge selection mode instruments, such as, for example, by a mass analyzer.

To reiterate, it is known that mass spectrometer systems most often provide ions from a desired single ion source along a directed ion path so as to be received by an analyzer for mass/charge (m/z) ratio interrogation. Generally, four, six, eight, or more equally spaced rods can be configured in an often substantially spherical arrangement to urge (i.e., guide) the ions along a single ion path to enable high efficiency capture, transmission, and/or storage of ions in a variety of instruments. While such configurations have provided the mass spectroscopy community a valuable tool, the resultant interlaced configurations of the present invention additionally enable introduced ions not just from a single ion source to be directed along a desired ion path but also enable ions from a separate distinct ion source to be introduced either in series or simultaneously into a first ion path. Such a novel design enables ions to be introduced if and when desired, for separate or conjunctive ion calibration and/or (m/e) ion analysis without the cost of ion source switching inefficiency that includes, but is not just limited to, disassembly and reassembly downtime. Another beneficial aspect of the present invention is provided by operating the Y-multipole device of the present invention in the reverse direction so as to enable ions from a single source to be sequentially directed off of the interlaced split to one or more stages, such as, for example, a separate pair of desired analyzers.

To enable a directional guidance of the ions in either of the above discussed operating modes, a RF voltage of adjustable phase and/or amplitude of up to about several kilovolts with a frequency from about 500 kHz up to about 2.5 MHz is applied to the alternating rods at 180 degrees out of phase from each other throughout the assembly. While such an arrangement is beneficial RF voltages having fixed RF phase relationships and amplitudes to the alternating rods can also be utilized. As an optional beneficial configuration, an applied distinct DC offset axial voltage gradient(s) (e.g., a voltage gradient from about +1V up to about +30V) can also be dynamically applied in conjunction with the RF to manipulate ions along desired directions. Moreover, ion traffic control can also be assisted via ion diffusion and/or gas flow methods as known and as understood by those of ordinary skill in the art. It is to be appreciated that the aforementioned distinct applied DC offset voltage gradient(s) can be implemented preferably using one or more DC axial field electrodes, as known and understood in the art, which can be situated external to or integrated with or between the electrode structures that make up the Y-multipole devices described herein. Example DC axial field electrode configurations can include, coupling DC voltages to segmented portions of the Y-multiple structures, providing a set of conductive metal bands spaced along each rod with a resistive coating between the bands, providing resistive coatings to tube structures, resistive or coated auxiliary electrodes, finger electrodes, curved thin plates contoured to match the curvature of the electrode set structures, and/or other means known to one of ordinary skill in the art to move ions via induced DC axial forces along desired ion paths.

To assist in the production of such RF and DC fields, known components and circuitry, such as, computers, RF and DC voltage supplies, RF and DC controllers, digital to analog converters (DACS), and programmable logic controllers for dynamic control of the applied DC voltages are integrated into the present invention so as to move ions along desired ion paths within the Y-multipole apparatus and/or other components integrated into the systems described herein. Moreover, because voltage supplies required to provide the various RF and DC voltage levels are capable of being dynamically controlled via, for example, a computer, the magnitude and range of voltages may be adjusted and changed to meet the needs of a particular sample or set of target ions to be analyzed.

It is also to be appreciated that within the systems disclosed herein, one or more ion lenses known by those of ordinary skill in the art can also be introduced to guide desired ions along a predetermined ion path. Such ion lenses can include, but are not limited to, lens stacks (not shown), inter-pole lenses, conical skimmers, gating means, (e.g., split gate lenses), etc., to cooperate with the Y-multipole devices of the present invention so as to direct predetermined ions along either longitudinal direction in order to be received by other subsequent sections and/or downstream instruments such as, for example, a mass analyzer.

Accordingly, by providing the configurations and approaches of the present invention, the resultant merged or separated ion beams can be interrogated and/or manipulated by the interlaced (i.e., the combined) Y-multipole structures disclosed herein. In particular, if configured to operate in the merged configuration, ions from either of the separate sources can be operated solely for sole ion calibration and/or (m/e) ion analysis but beneficially separate sources are more often simultaneously merged by directing ions from a second beam path into a first beam path to enable, for example, conjunctive ion calibration and/or (m/e) ion analysis with ions resulting from the source as received along the first beam path. Also beneficially, if the multipole device of the present invention is configured to operate in the reverse direction, the present invention enables ions resulting from a single source to be directed sequentially to a pair of instruments, such as, but not limited to, a Time of Flight (TOF) mass analyzer and a triple quadrupole (Q3)/linear trap hybrid configured with a switching functionality of the present interlaced device near the collision cell to enable analysis with either the (Q3) or the linear trap.

Specific Description

Turning now to the drawings, FIG. 1 shows a basic view of an exemplary Y-multipole ion optic apparatus, generally designated by the reference numeral 10. Such an example arrangement includes a pair of substantially straight electrode sets, as shown denoted by the letters I and II respectively (e.g., quadrupoles), capable of having induced RF radial field components that can substantially contain the ions close to the axis of such electrode set structures and interlaced to provide for a multipole structure (e.g., an octupole) at a portion III, as provided by the interlacing configuration and as generally shown at the rod face ends of electrode sets I and II. A beneficial aspect of such a structure is the capability of directing desired ions either into a resultant interlaced single ion optic pathway or along distinct separate directions if operated in a reverse mode.

Specifically, the Y-multipole 10 of FIG. 1 can be configured to either direct ions along separate ion pathways via electrode sets I and II to merge ion beams at the into a single ion directed path 11 provided by a resultant interlaced multipole structure III (e.g., a resultant octupole) or if utilized in the reverse direction, enables the sequential separation of ions along distinct ion path directions, e.g., along 11' and 11" (as shown with accompanying dashed directional arrows), via the respective structured split electrode sets I and II of the device 10. By incorporating such a device 10 into a mass spectrometer system enables at least one ion source but beneficially two ion sources to be coupled to downstream instruments, e.g., an analyzer, or if operated in the reverse mode, enables ions originating from a single source to be coupled to one or more desired downstream instruments (e.g., a mass analyzer).

Figure 2:
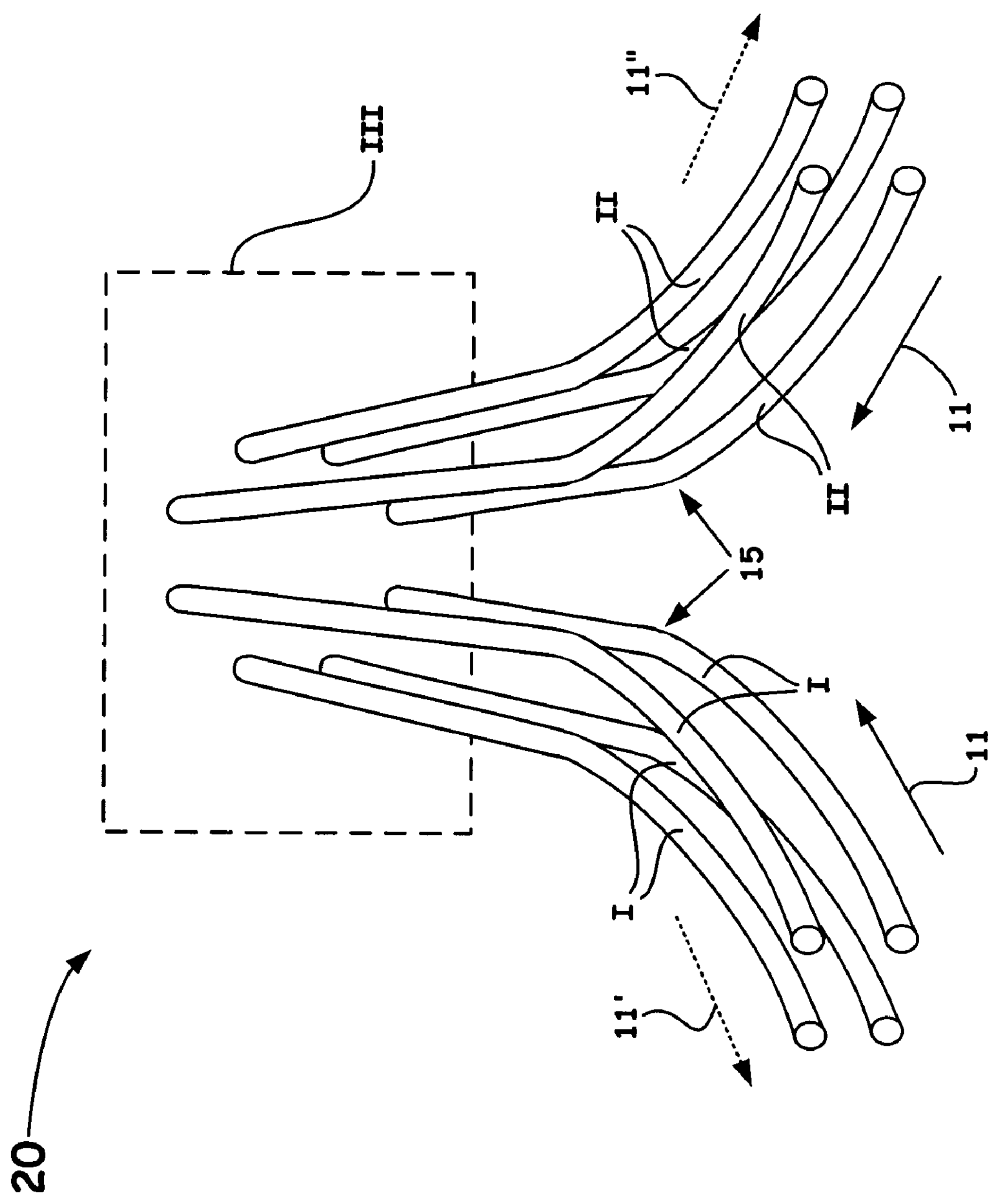
FIG. 2 illustrates a second general configuration of an interlaced Y-multipole device having smoothly contoured electrodes.

FIG. 2 shows another exemplary interlaced Y-multiple ion optic apparatus, now generally designated by the reference numeral 20. In this example arrangement, however, the pair of electrode sets I and II of FIG. 1 (e.g., ion guides) are now configured with a substantially smooth radius of curvature (e.g., see reference numeral 15) of which still enable the production of induced RF radial field components to substantially contain the ions close to the axis of such electrode set structures. As before in the discussion of FIG. 1, the Y-multipole 20 of FIG. 2 can also be configured to either merge ion beams into a single ion directed channel path 11 via a resultant interlaced multipole structure (e.g., an octupole as generally shown by the denoted dashed plane III), or if desired, to split from the multipole interlaced structure III so as to enable desired ions to instead be sequentially directed along distinct ion channel path directions, e.g., 11' and 11" (shown with accompanying dashed directional arrows) via the respective structured split electrode sets I and II. Also similar to the Y-multipole 10 described above and as shown in FIG. 1, the Y-multiple 20 device of FIG. 2 also beneficially enables at least one ion source but beneficially two ion sources to be coupled to downstream instruments, e.g., an analyzer, or if operated in the reverse mode, enables ions originating from a single source to be coupled to one or more of such downstream instruments.

Generally described, the Y-multipole 10, 20 device(s) of the present invention itself is often a configured pair of multipole devices having an equivalent set of electrodes, wherein each of the configured electrodes is capable of being configured to have operating lengths of up to about 20 cm that are interlaced (combined) to produce a resultant multipole structure. For example, the Y-multipole 10, 20 devices disclosed herein can result from a pair of tripoles interlaced (i.e., combined in a manner) to form a hexapole, a pair of quadrupoles interlaced (i.e., combined in a manner) to form an octupole, or a pair of hexapoles interlaced to form a dodecapole, or as another beneficial example, a pair of octupoles interlaced to produce a hexadecapole configuration. Alternatively, while the above mentioned configurations are preferable in arrangement, the resultant multipoles of the present invention can also be configured from multipole devices having a non-equivalent number of electrodes, such as, for example, a quadrupole interlaced (i.e., combined in a manner) with a hexapole to provide a decapole or an octapole interlaced with a quadrupole to provide, for example, a dodecapole.

Moreover, while a desired shape of the electrodes that make up the Y-multipole 10, 20 device(s), as disclosed herein, are often hyperbolic, it is to be appreciated that flat or circular cross sectioned rods also having lengths of greater than about 2.4 cm, more often from about 2.4 cm up to about 20 cm, can also be used to generate RF electric field lines similar to the theoretically ideal hyperbolic field lines between the rods without departing from the scope and spirit of the invention.

Beneficially, example ion beam sources that can be singly or simultaneously coupled to the configurations of the Y-multipole devices 10, 20 of the present invention can include a variety of sources known and understood by those in the field of mass spectroscopy, such as, but not limited to, an Electrospray Ionization Source (ESI), a Nanoelectrospray Ionization source (NanoESI), an Atmospheric Pressure Ionization source (API), an electron impact (EI) ionization source, a chemical ionization (CI) source, an EI/CI combination ionization source, a Surface-Enhanced Laser Desorption/Ionization (SELDI), a Laser Desorption Ionization (LDI) ion source, and a Matrix Assisted Laser Desorption/Ionization (MALDI) source. With respect to simultaneously coupling two ion sources, an application can include merging ions resultant from an API source and a MALDI source to eliminate the time from switching from one source to another. Another beneficial application would be to couple an API source and an EI/CI source for generating Electron-Transfer Disassociation (ETD) reagents.

It is also to be appreciated that a number devices configured as analyzers (any device capable of separating ions based on one or more of m/z, charge, species, ion mobility and combinations thereof, can also be coupled to the Y-multipole device(s) described herein and can include systems having single stage devices, e.g., linear ion traps (LIT), an ion cyclotron resonance (ICR), an orbitrap, a Fourier Transform Mass Spectrometer (FTMS), or dual stage mass analyzers, such as, a quadrupole/orthogonal acceleration time of flight (oa-TOF), a linear ion trap-time of flight (LIT-TOF), a linear ion trap (LIT)-orbitrap, a quadrupole-ion cyclotron resonance (ICR), an ion trap-ion cyclotron resonance (IT-ICR), a linear ion trap-off axis-time of flight (LIT-oa-TOF), or a linear ion trap (LIT)-orbitrap mass analyzer.

Figure 3:
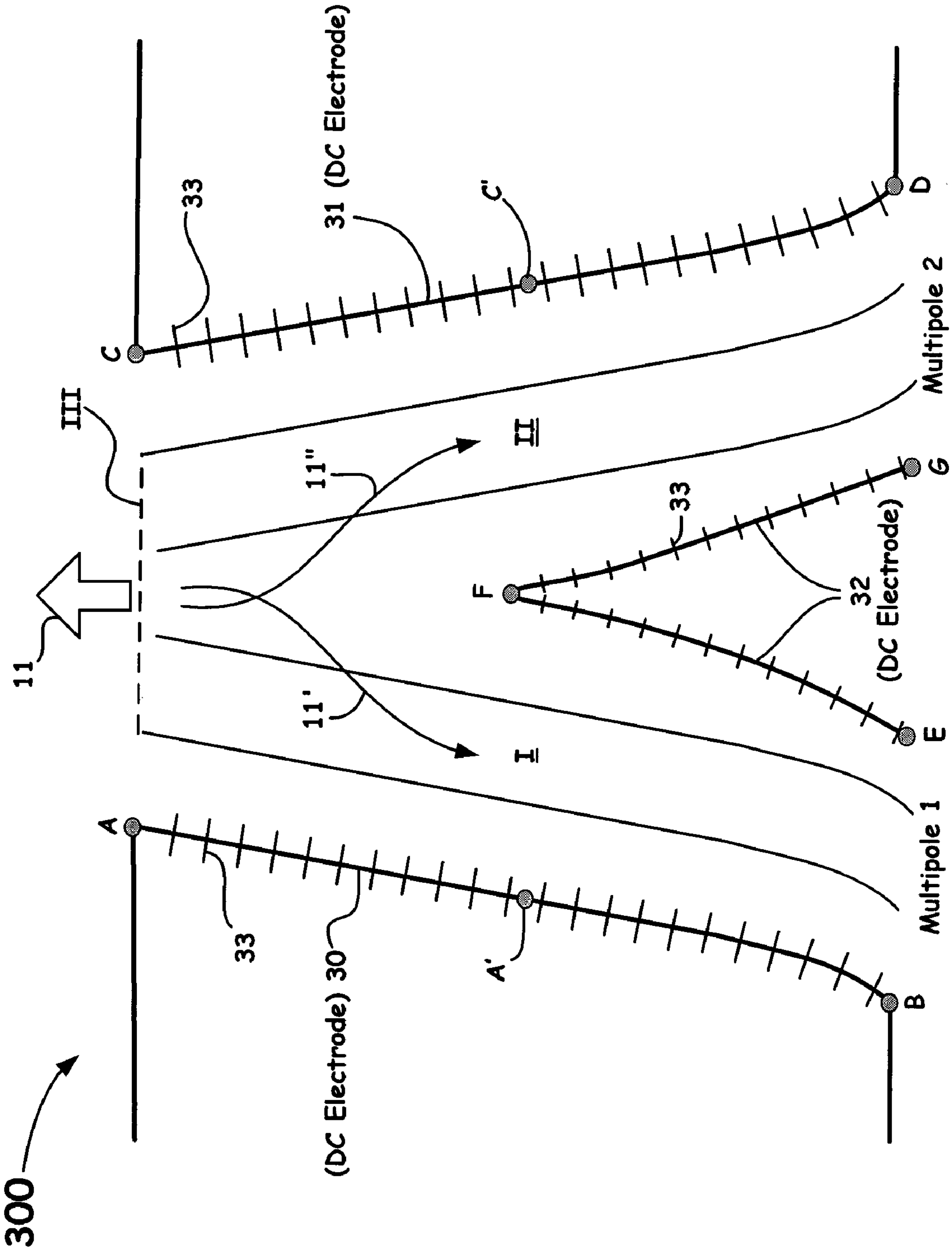
FIG. 3 shows an interlaced Y-multipole configured with DC offset electrodes.

FIG. 3 illustrates a more detailed view of an example Y-multipole configuration, generally denoted by the reference numeral 300. Such a novel apparatus can be configured to sequentially guide ions from a source toward alternative desired ion paths (i.e., as shown by directional arrows denoted by reference numbers 11' and 11"), or in the alternative, guide ions produced from separate sources along a desired single ion path 11 (as shown by an accompanying large directional arrow) via the resultant interlaced multipole electrode sets I and II (e.g., Mutipoles 1 and 2 merged into an interlaced region III (shown as a dashed line)). Also shown in the example Y-multipole 300 of FIG. 3 are electrically coupled DC electrodes 30, 31, and 32 (e.g., vane electrodes) shown as example branched portions 33 (e.g., finger electrodes) to illustrate the capability of having monotonically increasing or decreasing applied DC levels. The relative positioning of the rod electrode sets I and II and electrodes 30, 31, and 32 in FIG. 3 is somewhat exploded for improved illustration. However, such electrodes are designed to occupy positions that minimize interference with the RF polar fields resulting from the electrode sets I and II of FIG. 3.

When operating the device 300 of FIG. 3 in either directional mode so as to either separate ions from a single source (not shown) into alternative paths 11' and 11" or merge ions from separate sources (not shown) into a single ion path 11, as shown in FIG. 3, it is to be appreciated, as known to those of ordinary skill in the art, that opposite RF voltages are often applied to each pair of oppositely disposed main RF electrode sets (e.g., sets I and II) via an electronic controller (not shown) so as to contain ions in a desired radial manner. Along with the aforementioned applied RF voltage(s), the electrodes 30, 31, and 32 of FIG. 3, shown with an array of branched portions 33, are configured to also create an axial DC electric field and thus DC axial forces in a predetermined fashion within multipole electrode sets I, II so as to urge ions along a desired longitudinal direction.

The example branched portions 33 themselves, as shown in FIG. 3, may be designed finger electrodes having computer (not shown) controlled dynamically applied voltages or, for example, configured resistive elements (e.g., a resistor) having in some instances, predetermined capacitive elements (i.e., to reduce RF voltage coupling effects), configured so that the desired resistive nature itself sets up a respective voltage divider along lengths of the electrodes 30, 31, and 32. The point to be made however, is that regardless of how the DC voltage gradient is formed, which are often static voltages, the resultant voltages form a range of voltages, often a range of step-wise monotonic voltages to create a voltage gradient in the axial direction that urges ions along either ion paths 11', 11" or if operated in the forward direction, toward a desired ion path 11, as shown in FIG. 3.

To illustrate a method of operation so as to alternatively separate ions into desired downstream instruments and/or other coupled sections of a mass spectrometer, the reader of the present application is directed to the set of plots shown in FIGS. 4A-D in order to aid in the understanding of operating the example Y-multipole embodiment of FIG. 3 in the reverse mode (i.e., to sequentially direct ions along predetermined ion channel paths).

In particular, FIGS. 4A-D graphically show applied relative DC voltage gradient levels along the electrodes 30, 31, and 32 of the present invention, as shown in FIG. 3. Such DC voltage gradients, along with other disclosed aspects of the present invention, enable desired ions received by the interlaced multipole structure III to be directed alternatively along either ion path 11" that comprises multipole electrode set II (i.e., Multipole 2) or to ion path 11' that comprises multipole electrode set I (i.e., a Multipole 1).

Figures 4A, 4B, 4C, 4D:
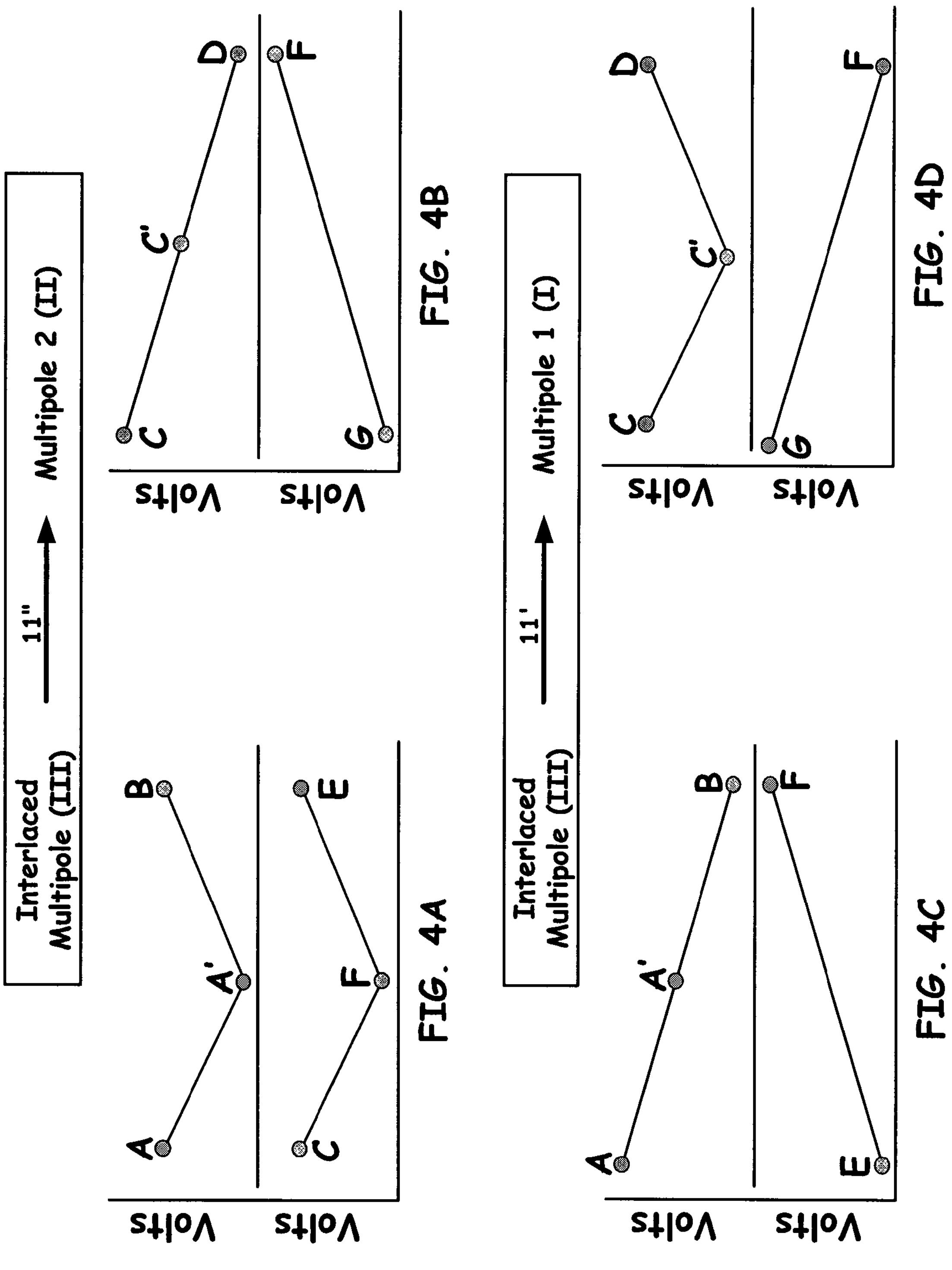
FIGS. 4A-4D illustrates applied DC gradient potentials to direct ions from an example interlaced multipole resultant ion channel path sequentially along to separate multipole ion channel paths.

Specifically, to direct ions received at the interlaced multipole junction III into ion path 11" of electrode set II (i.e., Multipole 2), relative DC voltage gradients are desirably applied to the DC electrodes 30, 31, and 32 of FIG. 3 to induce the DC voltage gradients that are illustratively shown in FIGS. 4A and 4B. For example, to provide the aforementioned guidance of ions, the top plot of FIG. 4A shows applied relative decreasing and increasing DC voltage gradients induced along the DC electrode 30 structure of FIG. 3 (as illustrated at positions A, A', B) while the bottom plot of FIG. 4A shows simultaneously applied relative DC voltage gradients to the DC electrodes 31 and 32 of FIG. 3, i.e., a decreasing voltage level at position C of DC electrode 31 as related to position F of DC electrode 32 and an increasing voltage level from position F of DC electrode 32 as related to position C also as induced along electrode 32. Simultaneously, as shown in FIG. 4B, the top plot shows an applied overall decreasing DC voltage level along DC electrode 31 of FIG. 3 (as illustrated at positions C, C', D) while the bottom plot of FIG. 4B shows an applied overall increasing DC voltage level, as illustrated by the voltage level at position G with respect to the voltage level at position F of electrode 32, as correspondingly shown in FIG. 3. Accordingly such example DC voltage gradients, as illustrated in FIG. 4A and FIG. 4B that can be applied to the DC electrodes 30, 31, and 32, as shown in FIG. 3, enable ions received at the multipole interlaced junction III to be directed to electrode set II (i.e., Multipole 2).

Following along in the discussion of example reverse mode operations of the Y-multipole device of the present invention, to direct ions received at the interlaced multipole junction III into ion path 11' of electrode set I (i.e., Multipole 1), relative DC voltage gradients are again desirably applied to the DC electrodes 30, 31, and 32 of FIG. 3 to induce the DC voltage gradients illustratively shown in FIGS. 4C and 4D. In particular, to provide the aforementioned guidance of ions into ion path 11', the top plot of FIG. 4C shows an applied overall decreasing DC voltage level along DC electrode 31 of FIG. 3 (again as illustrated at positions A, A', B) while the bottom plot of FIG. 4C shows an applied overall increasing DC voltage level, as illustrated by the voltage level at position G with respect to the voltage level at position F of electrode 32, again as correspondingly shown in FIG. 3.

In this example arrangement however, simultaneously applied relative decreasing and increasing voltage levels, as shown in the top plot of FIG. 4D, are induced along the DC electrode 31 structure of FIG. 3 (as illustrated at positions C, C', D) and an overall decreasing voltage level, as shown in the bottom plot of FIG. 4D, is induced along electrode 32, as shown by the relative DC voltage at position G with respect to the relative DC voltage at position F. Accordingly desired ions received at the interlaced multipole junction III, as shown in FIG. 3, can be preferentially directed to electrode set I (i.e., Multipole 1).

Figure 5A:
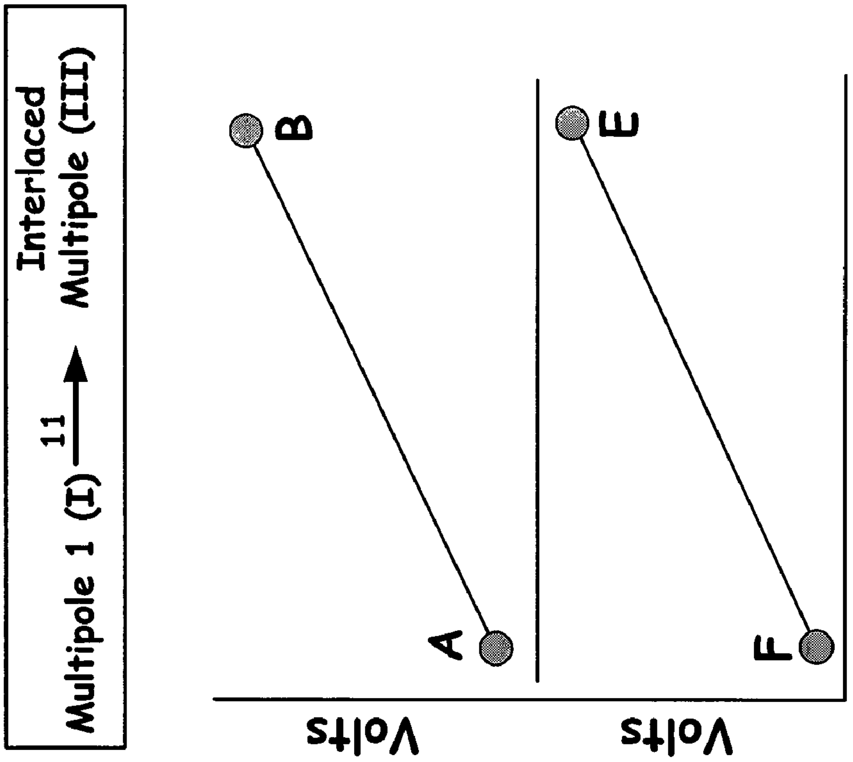
FIGS. 5A-5B illustrates applied DC gradient potentials to direct ions from separate multipole ion channel paths to a resultant interlaced multipole ion channel path of the present invention.
Figure 5B:
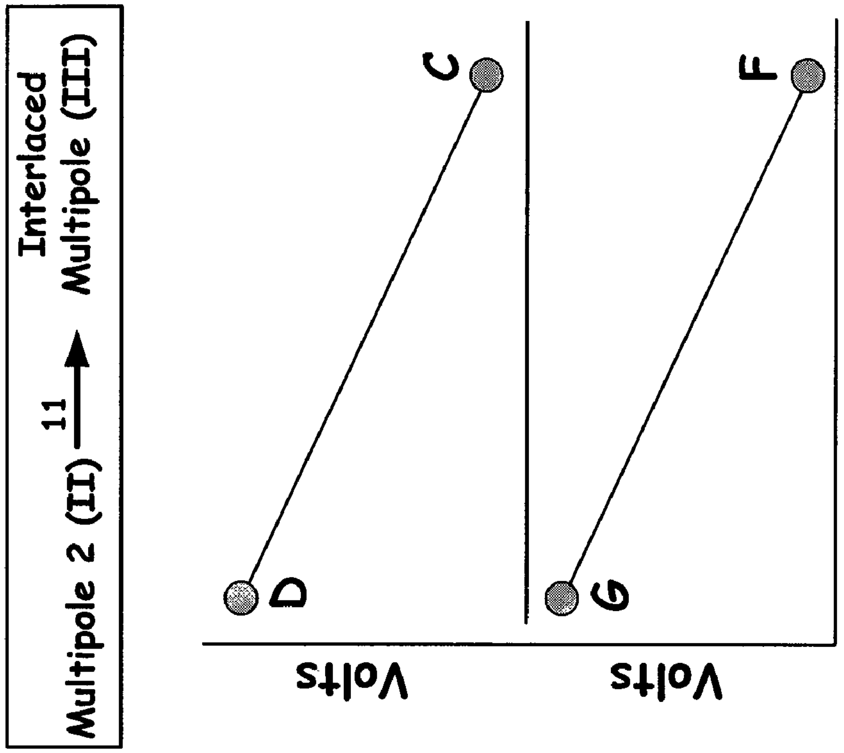

Turning now to a forward method of operation of the Y-multipole of the present invention so as to direct ions provided by one or more ions sources into desired downstream instruments and/or other coupled sections of a mass spectrometer, the reader of the present application is now directed to the set of plots shown in FIGS. 5A and 5B.

To illustrate such a mode of operation, FIGS. 5A-B graphically show applied relative DC voltage gradient levels via example positions A,B for electrode 30, D,C, for electrode 31, and E, F, and G positions along electrode 32, as also correspondingly shown in FIG. 3. Such DC voltage gradients, along with other disclosed aspects of the present invention, enable desired ions from one or more ion sources, to be directed along either ion path 11" that comprises multipole electrode set II (i.e., Multipole 2) or ion path 11' that comprises multipole electrode set I (i.e., a Multipole 1) so as to be received by the interlaced multipole structure III for further ion path manipulation.

As an example of operation so as to direct ions either alone or simultaneously into the interlaced multipole junction III via the aforementioned electrode sets I and II, as shown in FIG. 3, it is to be appreciated that predetermined relative DC voltage gradients are simultaneously applied to the DC electrodes 30, 31, and 32 of FIG. 3, so as to induce the relative DC voltage gradients illustratively shown in FIGS. 5A and 5B.

In particular, to direct ions along electrode set I (alone or simultaneously along with ions directed by electrode set II) so as to be received by the interlaced multipole junction III of FIG. 3, it is instructive that both of the plots of FIG. 5A show applied relative increasing DC voltage levels induced along the respective DC electrodes 30 and 32 of FIG. 3. For example, the top plot of FIG. 5A shows an applied overall increasing DC voltage level, as illustrated by the lower relative DC voltage level at position A with respect to the DC voltage level at position B of electrode 32, as correspondingly shown in FIG. 3 and the bottom plot of FIG. 5A shows a lower relative DC voltage level at position F with respect to the relative DC voltage level at position E of electrode 32, also as correspondingly shown in FIG. 3.

In addition, to direct ions along electrode set II (alone or simultaneously along with ions directed by electrode set I) to be received by the interlaced multipole junction III of FIG. 3, it is again instructive to note that both of the plots FIG. 5B show simultaneously applied overall decreasing DC voltage levels as induced along the electrode 31, as shown correspondingly in FIG. 3. In particular, as simultaneously applied along with the voltage gradients described above with respect to FIG. 5A, the top plot of FIG. 5B shows a higher relative DC voltage level at position D with respect to the DC voltage level at position C of electrode 32, as correspondingly shown in FIG. 3, while the bottom plot of FIG. 5B also shows a higher relative DC voltage level at position G with respect to the relative DC voltage level at position F of electrode 32, also as correspondingly shown in FIG. 3.

Accordingly such example DC voltage gradients, as illustrated in FIG. 5A and FIG. 5B that can be applied to the DC electrodes 30, 31, and 32, as shown in FIG. 3, enable ions to be directed to the multipole interlaced junction III for urging to a respective downstream instrument and/or subsequent mass spectrometer stage.

Figure 6:
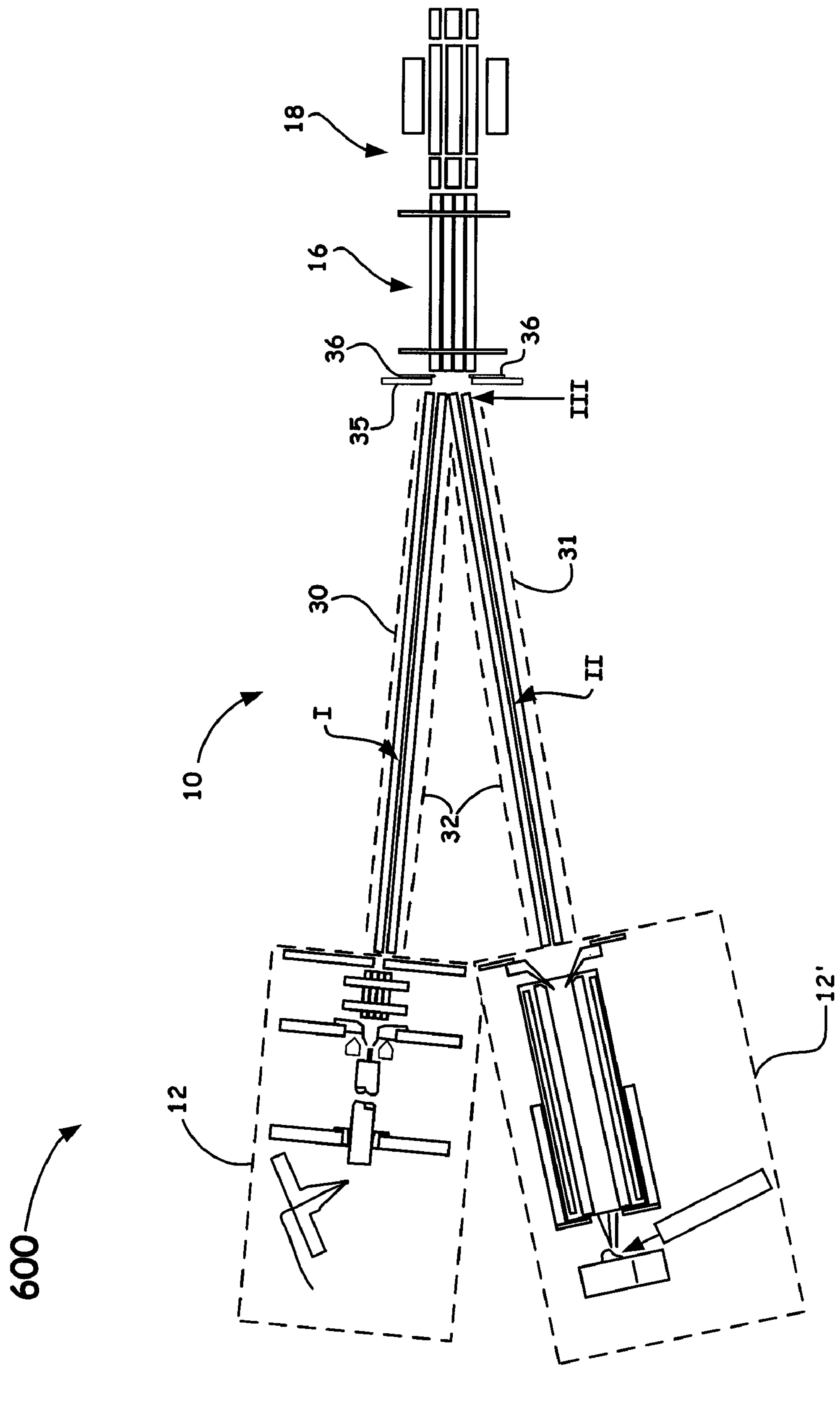
FIG. 6 shows an example general spectrometer that utilizes an interlaced Y-multipole having straight electrodes to merge ions into a resultant ion channel.

FIG. 6 shows an example arrangement of a mass spectrometer system, generally designated by the reference numeral 600, having novel straight Y-multipole 10 embodiment configured with straight electrode set sections I and II, as previously discussed above and as shown in the example arrangement of FIG. 1. Specifically, the example mass spectrometer 600 depicted in FIG. 6, is shown with a straight Y-multipole 10 coupled to an arranged pair of example ion sources that in this exemplary configuration includes an Electrospray Ionization Source (ESI) 12 (shown enclosed within a dashed box) and a Matrix Assisted Laser Desorption/Ionization (MALDI) ion source 12' (also shown enclosed within a dashed box). The illustrative sources 12 and 12' are each beneficially coupled to a respective electrode set section I and II having the coupled DC electrode structures 30, 31, and 32 configured to substantially align with the contours of the straight Y-multipole 10 device disclosed herein. In this arrangement, produced ions by either source can be solely directed to the interlaced region III via either of the coupled electrode sets I or II for interrogation using controls inherent in such systems and disclosed herein, which of course necessarily includes the application of the appropriate RF and DC applied voltages to the Y-multipole 10 structure itself. A beneficial use of the present invention, however, is to direct ions simultaneously produced by the sources (e.g., ESI 12 and MALDI 12' sources) via the coupled electrode sets I and II so as to merge such produced ions at the interlaced junction III using RF fields applied to the electrode sets I and II and by using the above described DC voltage gradient example method of operation, as described above and as shown in FIGS. 5A and 5B. Such beneficial arrangements and methods of operation enable separate ion calibration and/or (m/e) ion analysis or conjunctive ion calibration and/or (m/e) ion analysis of such resultant ions as enabled by subsequent downstream instruments, such as, ion guides (e.g., ion guide 16) and analyzer(s) 18.

Figure 7:
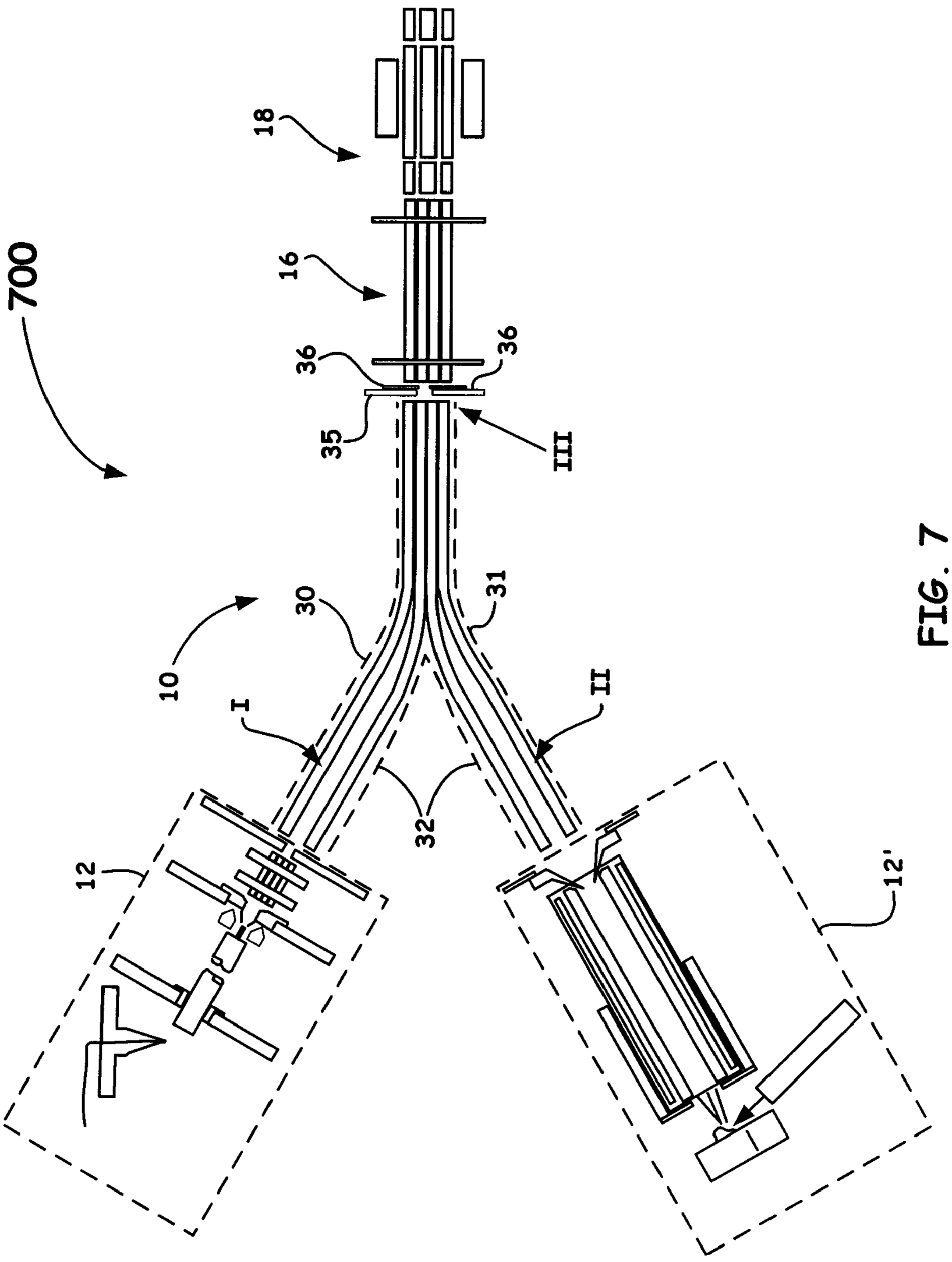
FIG. 7 shows an example general spectrometer that utilizes an interlaced Y-multipole having smoothly contoured electrodes to merge produced ions into a resultant interlaced ion channel.

FIG. 7 shows another example arrangement of a mass spectrometer system, now generally designated by the reference numeral 700. In this example arrangement, the directional guidance of desired ions, as discussed above, is provided by an interlaced Y-multipole 10 embodiment that is now configured with smoothly contoured electrode sets I and II, as shown in FIG. 2 as well as in FIG. 3, and thus correspondingly configured with smoothly contoured DC electrode sets I and II, as also shown generally shown in FIG. 3.

In particular, the example mass spectrometer 700 depicted in FIG. 7, is shown with a smoothly contoured interlaced Y-multipole 10 coupled to an arranged pair of example ion sources discussed above for FIG. 6, i.e., the Electrospray Ionization Source (ESI) 12 (again shown enclosed within a dashed box) and a Matrix Assisted Laser Desorption/Ionization (MALDI) ion source 12' (also again shown enclosed within a dashed box). As before, the illustrative sources 12 and 12' are each beneficially coupled to a respective electrode set section I and II. Also as before, each electrode set section I and II is arranged with coupled DC electrode structures 30, 31, and 32 as disclosed herein. Following along, the produced ions can thus be solely directed via a known coupled electrode set I or II for interrogation and directed using the interlaced Y-multipole 10 of the present invention. However, it is to be appreciated that a beneficial use of the present invention is to direct ions simultaneously by such sources, e.g., ESI 12 and MALDI 12', via the coupled electrode sets I and II so as to merge such produced ions at the interlaced junction III using RF fields applied to the electrode sets I and II and by using the above described DC voltage gradient example method of operation, as described above and as shown in FIGS. 5A and 5B. Such beneficial arrangements and methods of operation enable separate ion calibration and/or (m/e) ion analysis or conjunctive ion calibration and/or (m/e) ion analysis of such resultant ions as enabled by subsequent downstream instruments, such as, ion guides (e.g., ion guide 16) and analyzer(s) 18.

Figure 8:
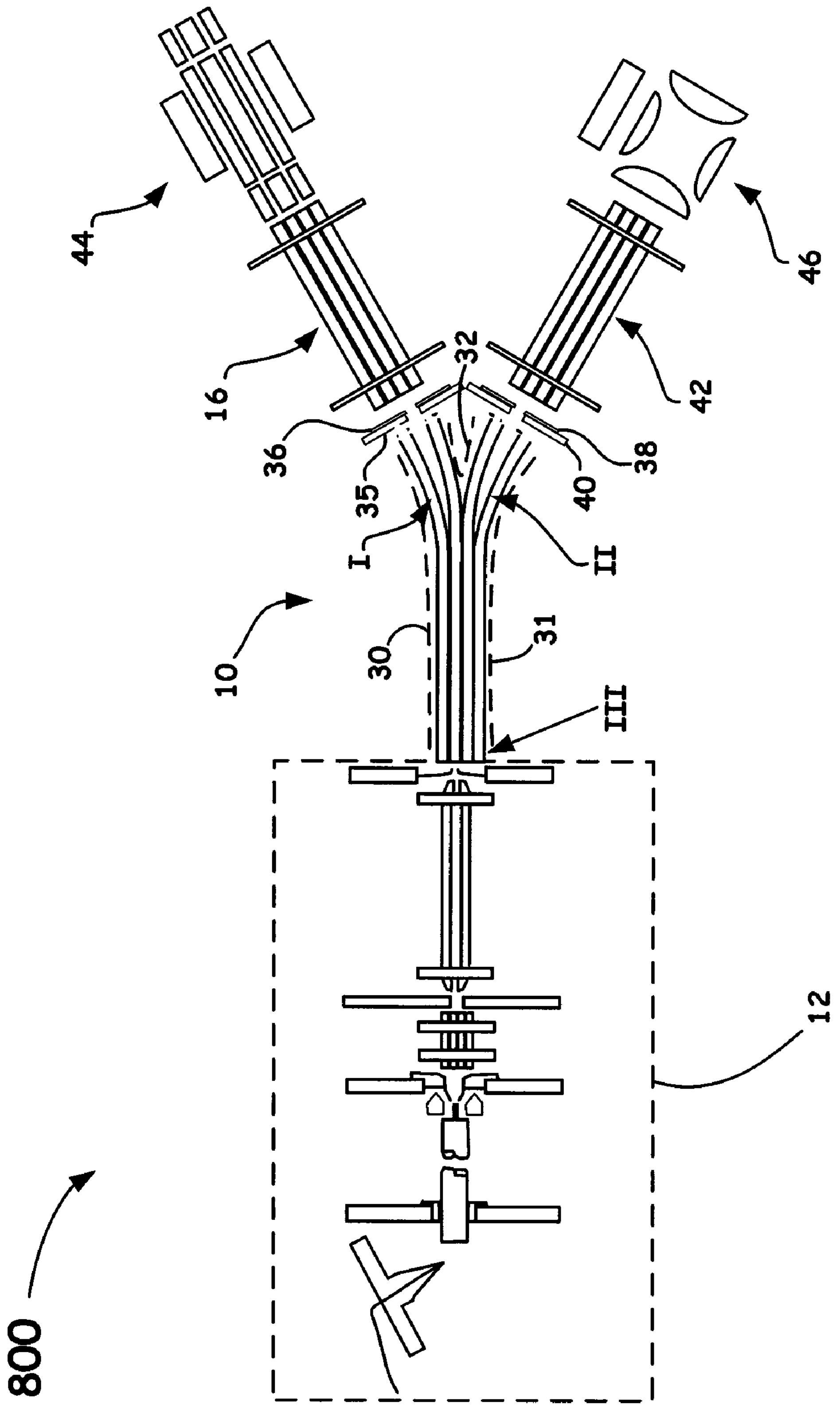
FIG. 8 shows an example general spectrometer that utilizes the device of the present invention to sequentially separate ions received at an interlaced ion channel into either of the separately configured ion channels.

FIG. 8 shows another beneficial example arrangement of a mass spectrometer system, generally designated by the reference numeral 800, now configured with the aforementioned smoothly contoured Y-multipole 10 of the present invention arranged to operate in the "reverse" mode, i.e., a mode that sequentially directs produced ions along a desired ion channel path. While such a smoothly contoured Y-multipole 10 version is shown in FIG. 8, it is to be appreciated that the straight Y-multipole electrode set configuration, as shown in FIG. 1 can equally be utilized within the system 800 of FIG. 8 without departing from the scope of the present invention. With either Y-multipole device, the directional guidance of desired ions, as discussed above, is provided by the electrode sets I and II, as shown in FIG. 2 as well as in FIG. 3, using along with other known ion direction guidance methods (e.g., ion lenses and flow gases) generated RF fields and DC voltage gradients to manipulate such ions sequentially to either electrode set section I, II, as stated above with respect to the discussion of FIG. 3.

In this beneficial configuration, the example mass spectrometer 800 depicted in FIG. 8, is shown with smoothly contoured electrode sets I and II merging into an interlaced junction III, now arranged so that the interlaced junction III section of the device is coupled to an example single ion source, i.e., an Electrospray Ionization Source (ESI) 12 (again shown enclosed within a dashed box) but with the electrode set sections I, II coupled to respective downstream instruments 44 and 46. Generally described, ions can be generated in the ESI 12 source via system controls and directionally manipulated along either of electrode set sections I, II via applied RF fields assisted by the DC voltage gradients induced by DC electrodes 30, 31, and 32, as discussed above in the description of FIG. 3. By utilizing the directional guidance of the interlaced Y-multipole 10 of the present invention, one or more coupled analyzers, e.g. a linear trap 44 and a 3-dimensional trap 46 or other instruments (e.g., multipoles 26, 42)/subsections of a mass spectrometer 800 can be beneficially utilized to sequentially receive ions for further manipulation and/or interrogation. While a linear trap 44 and a 3-dimensional trap 46 are shown as example downstream instruments in FIG. 8, other beneficial configurations can also be utilized, such as, but not limited to, sequentially directing such produced ions to a Time of Flight (TOF) mass analyzer and a triple quadrupole (Q3)/linear trap hybrid configured with the switching functionality of the present device near the collision cell to enable analysis with either the (Q3) or the linear trap. Accordingly, it is to be appreciated that any number of analyzing instruments, as previously discussed above, can be integrated into the system 800 of FIG. 8 to provide for the desired control and analysis.

It is to be noted that he generally depicted mass spectrometer systems 600, 700, and 800, as discussed above, may also include an electronic controller and one or more power sources for supplying RF (e.g., fixed voltage amplitudes and phases or controllably adjustable amplitudes and phases to the Y-multipole electrodes for ion radial confinement) as well as DC voltages to predetermined electrodes and devices, such as, for example, DC electrodes 30, 31, and 32 operably coupled with the Y-multipole 10 configurations of the present invention, trapping devices/analyzers, and other electrode structures, ion traps, etc., of the present invention.

Moreover, an electronic controller configured with embodiments of the present invention is also often operably coupled to various other devices known to be implemented in such systems, e.g., pumps, sample plates, illumination sources, sensors, lenses 35, 40 gating lenses 36, 38, ion guides, 16, 42, and detectors, etc., so as to control such devices/instruments and conditions at the various locations throughout a configured system, as well as to receive and send signals representing the particles being analyzed. As also known to those skilled in the art, any number of vacuum stages may also be implemented to enclose and maintain any of such devices/instruments along the ion paths to provide for predetermined pressures, such as, and often at, a lower than atmospheric pressure.

In addition, it is to also be appreciated that in being directed to such example mass analyzers, the resultant ions can and often are transported through a series of chambers of progressively reduced pressure by a set of ion optic components, e.g., ion apertures, skimmer cones, electrostatic lenses, and multipoles selected from radio-frequency RF multipole ion guides, e.g., octupoles, quadrupoles, that restrict, guide and focus ions to provide good transmission efficiencies. The various chambers communicate with corresponding ports as known in the art (not shown) that are coupled to a set of pumps (not shown) to maintain the pressures at the desired values. The operation of a configured mass spectrometer, such as, the systems shown in either of FIGS. 6-8, is more often controlled and data is acquired and processed by a control and data system (not depicted), which may be implemented as any one or a combination of general or special-purpose processors, firmware, software), and hardware circuitry configured to execute a set of instructions that embody the prescribed data analysis and control routines of the present invention. Such processing of the data may also include averaging, scan grouping, deconvolution, library searches, data storage, and data reporting.

It is also to be appreciated that instructions to start any of the operations inherent in the systems disclosed herein, such as, for example, the identifying of a set of m/z values, the merging of data, the exporting/displaying of results, etc., may be executed under instructions stored on a machine-readable medium (e.g., a computer readable medium) coupled a particular mass spectrometer. A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software. When, for example, mass spectra data of a mass spectrum is received by the apparatus/system disclosed herein, the information embedded in a computer program of the present invention can be utilized, for example, to extract data from the mass spectral data, which corresponds to a selected set of mass-to-charge ratios. In addition, the information embedded in a computer program of the present invention can be utilized to carry out methods for normalizing, shifting data, or extracting unwanted data from a raw file in a manner as and as understood by those of ordinary skill in the art.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing.

The invention claimed is:

1. An apparatus for guiding ions, comprising:

an interlaced set of electrodes that defines a resultant multipole ion channel, said interlaced set of electrodes being configured from a first set of electrodes and a second set of electrodes separately adapted to respectively define a first ion channel path and a second ion channel path, wherein to provide for said resultant multipole ion channel, said first set of electrodes and said second set of electrodes comprise configurations selected from: a pair of tripoles interlaced to form a hexapole, a pair of quadrupoles interlaced to form an octupole, a pair of hexapoles interlaced to form a dodecapole, a pair of octupoles interlaced to produce a hexadecapole, a quadrupole interlaced with a hexapole to provide a decapole, and an octapole interlaced with a quadrupole to provide for a dodecapole; and an RF voltage supply for applying RF voltages to at least some of the electrodes of said first and said second set of electrodes, said applied RF voltages being configured with a phase and amplitude so as to radially confine said ions within said first and said second ion channel paths.

2. The apparatus of claim 1, said apparatus further comprising:

a plurality of DC electrodes; and a DC voltage supply adapted to produce DC voltage gradients along said plurality of DC electrodes so that resultant axial forces can direct one or more injected ions in either longitudinal direction within said first and/or said second ion channel paths.

3. The apparatus of claim 2, wherein said DC voltage supply is controlled to dynamically apply a monotonically increasing or decreasing voltage level along a length of said plurality of DC electrodes.

4. The apparatus of claim 1, wherein said first set of electrodes and said second set of electrodes comprises smoothly contoured electrodes.

5. The apparatus of claim 1, wherein said first set of electrodes and said second set of electrodes further comprises straight electrodes.

6. The apparatus of claim 1, wherein said apparatus for guiding ions is configured so that a first inlet end of said first ion channel path and a second inlet end of said second ion channel path are respectively coupled to a first and a second ion source.

7. The apparatus of claim 1, wherein said apparatus for guiding ions is configured so that a first outlet end of said first ion channel and a second outlet end of said second ion channel are respectively coupled to a first and a second analyzer.

8. The apparatus of claim 1, wherein said apparatus for guiding ions is configured so that an interlaced junction end of said resultant multipole ion channel is coupled to an ion source.

9. The apparatus of claim 1, wherein said apparatus for guiding ions is configured so that an interlaced junction end of said resultant multipole ion channel is coupled to an analyzer.

10. The apparatus of claim 6, wherein said first and said second ion source comprises at least one ion source selected from: an Electrospray Ionization Source (ESI), a Nanoelectrospray Ionization source (NanoESI), an Atmospheric Pressure Ionization source (API), an electron impact (EI) ionization source, a chemical ionization (CI) source, an EI/CI combination ionization source, a Surface-Enhanced Laser Desorption/Ionization (SELDI) ion source, a Laser Desorption Ionization (LDI) ion source, and a Matrix Assisted Laser Desorption/Ionization (MALDI) ion source.

11. The apparatus of claim 8, wherein said ion source comprises at least one ion source selected from: an Electrospray Ionization Source (ESI), a Nanoelectrospray Ionization source (NanoESI), an Atmospheric Pressure Ionization source (API), an electron impact (EI) ionization source, a chemical ionization (CI) source, an EI/CI combination ionization source, a Surface-Enhanced Laser Desorption/Ionization (SELDI) ion source, a Laser Desorption Ionization (LDI) ion source, and a Matrix Assisted Laser Desorption/Ionization (MALDI) ion source.

12. The apparatus of claim 7, wherein said first and said second analyzer comprises at least one analyzer selected from: an ion cyclotron resonance (ICR), an orbitrap, a Fourier Transform Mass Spectrometer (FTMS), a quadrupole/orthogonal acceleration -time of flight (oa-TOF), a linear ion trap-time of flight (LIT-TOF), a linear ion trap (LIT)-orbitrap, a quadrupole-ion cyclotron resonance (ICR), an ion trap-ion cyclotron resonance (IT-ICR), a linear ion trap-off axis-time of flight (LIT-oa-TOF), and a linear ion trap (LIT)-orbitrap mass analyzer.

13. The apparatus of claim 9, wherein said analyzer comprises at least one analyzer selected from: an ion cyclotron resonance (ICR), an orbitrap, a Fourier Transform Mass Spectrometer (FTMS), a quadrupole/orthogonal acceleration -time of flight (oa-TOF), a linear ion trap-time of flight (LIT-TOF), a linear ion trap (LIT)-orbitrap, a quadrupole-ion cyclotron resonance (ICR), an ion trap-ion cyclotron resonance (IT-ICR), a linear ion trap-off axis-time of flight (LIT-oa-TOF), and a linear ion trap (LIT)-orbitrap mass analyzer.

14. A mass spectrometer system comprising:

one or more ion sources;

one or more analyzers;

an interlaced set of electrodes that defines a resultant multipole ion channel, said interlaced set of electrodes being configured from a first set of electrodes and a second set of electrodes separately adapted to respectively define a first ion channel path and a second ion channel path, wherein to provide for said resultant multipole ion channel, said first set of electrodes and said second set of electrodes comprise configurations selected from: a pair of tripoles interlaced to form a hexapole, a pair of quadrupoles interlaced to form an octupole, a pair of hexapoles interlaced to form a dodecapole, a pair of octupoles interlaced to produce a hexadecapole, a quadrupole interlaced with a hexapole to provide a decapole, and an octapole interlaced with a quadrupole to provide for a dodecapole, and wherein a first end of said first ion channel path and a second end of said second ion channel path is adaptable to either couple to devices that comprise said one or more ion sources or said one or more analyzers, and wherein a junction end of said resultant multipole ion channel is adaptable to also couple to a single device selected from said one or more ion sources or said one or more analyzers;

an electronic controller to control an RF voltage source for applying RF voltages to said first set of electrodes and said second set of electrodes;

a plurality of DC electrodes operationally coupled to said first set of electrodes and said second set of electrodes; and a DC voltage supply coupled to said plurality of DC electrodes via said electronic controller to dynamically produce DC voltage gradients along portions of said plurality of DC electrodes so as to provide axial forces to act on one or more injected ions so that said injected ions can be further manipulated along either longitudinal direction within said first and said second ion channel paths.

15. The mass spectrometer system of claim 14, wherein said first set of electrodes and said second set of electrodes comprises smoothly contoured electrodes.

16. The mass spectrometer system of claim 14, said first set of electrodes and said second set of electrodes further comprises straight electrodes.

17. The mass spectrometer system of claim 14, wherein said one or more ion sources comprises at least one ion source selected from: an Electrospray Ionization Source (ESI), a Nanoelectrospray Ionization source (NanoESI), an Atmospheric Pressure Ionization source (API), an electron impact (EI) ionization source, a chemical ionization (CI) source, an EI/CI combination ionization source, a Surface-Enhanced Laser Desorption/Ionization (SELDI) ion source, a Laser Desorption Ionization (LDI) ion source, and a Matrix Assisted Laser Desorption/Ionization (MALDI) ion source.

18. The mass spectrometer of claim 14, wherein said one or more analyzers comprises at least one analyzer selected from: an ion cyclotron resonance (ICR), an orbitrap, a Fourier Transform Mass Spectrometer (FTMS), a quadrupole/orthogonal acceleration -time of flight (oa-TOF), a linear ion trap-time of flight (LIT-TOF), a linear ion trap (LIT)-orbitrap, a quadrupole-ion cyclotron resonance (ICR), an ion trap-ion cyclotron resonance (IT-ICR), a linear ion trap-off axis-time of flight (LIT-oa-TOF), and a linear ion trap (LIT)-orbitrap mass analyzer.

19. The mass spectrometer system of claim 14, wherein said DC voltage supply dynamically applies a monotonically increasing or decreasing voltage level along a length of said plurality of DC electrodes.

20. The mass spectrometer system of claim 14, wherein said RF voltage source is configured to controllably adjust at least one of the phase and the amplitude of an RF voltage applied to at least some of the electrodes of said first and said second set of electrodes so as to radially confine said ions within said first or said second ion channel.

21. A method of operating a mass spectrometer having an interlaced rod set, comprising:

receiving ions within an interlaced set of ion guide electrodes that defines a resultant multipole ion channel; said interlaced set of electrodes being configured from a first and a second set of ion guide electrodes that respectively defines a first and a second ion channel path, wherein said resultant multipole ion channel is configured from said first and a second set of ion guide electrodes being selected from: a pair of tripoles interlaced to form a hexapole, a pair of quadrupoles interlaced to form an octupole, a pair of hexapoles interlaced to form a dodecapole, a pair of octupoles interlaced to produce a hexadecapole, a quadrupole interlaced with a hexapole to provide a decapole, and an octapole interlaced with a quadrupole to provide for a dodecapole;

providing an RF field within said first and said second set of ion guide electrodes to radially confine desired said received ions within said first and said second ion channel paths; and providing a DC voltage gradient to induce DC axial forces that act on said received ions so that said received ions can be sequentially directed along either of said first ion channel path or said second ion channel path.

22. The method of claim 21, said DC voltage gradient being provided as a monotonically increasing or decreasing DC voltage level along said first and said second ion channel paths.

23. The method of claim 21, said DC voltage gradient being provided as a dynamically controlled DC voltage gradient along said first and said second ion channel paths.

24. The method of claim 21, further comprising: coupling to an end of said interlaced set of ion guide electrodes so as to provide said received ions, at least one ion source selected from: an Electrospray Ionization Source (ESI), a Nanoelectrospray Ionization source (NanoESI), an Atmospheric Pressure Ionization source (API), an electron impact (EI) ionization source, a chemical ionization (CI) source, an EI/CI combination ionization source, a Surface-Enhanced Laser Desorption/Ionization (SELDI) ion source, a Laser Desorption Ionization (LDI) ion source, and a Matrix Assisted Laser Desorption/Ionization (MALDI) ion source.

25. The method of claim 24, further comprising: coupling to an end of either of said first and said second ion channel paths, at least one ion source analyzer selected from: an ion cyclotron resonance (ICR), an orbitrap, a Fourier Transform Mass Spectrometer (FTMS), a quadrupole/ orthogonal acceleration -time of flight (oa-TOF), a linear ion trap-time of flight (LIT-TOF), a linear ion trap (LIT)-orbitrap, a quadrupole-ion cyclotron resonance (ICR), an ion trap-ion cyclotron resonance (IT-ICR), a linear ion trap off axis-time of flight (LIT-oa-TOF), and a linear ion trap (LIT)-orbitrap mass analyzer.

26. A method of operating a mass spectrometer having an interlaced ion guide rod set, comprising:

receiving ions within a first and a second set of ion guide electrodes that are interlaced at an end to provide for a resultant multipole ion channel; wherein said first and said second set of ion guide electrodes further define a first and a second ion channel path, and wherein said resultant multipole ion channel is configured from said first and a second set of ion guide electrodes being selected from: a pair of tripoles interlaced to form a hexapole, a pair of quadrupoles interlaced to form an octupole, a pair of hexapoles interlaced to form a dodecapole, a pair of octupoles interlaced to produce a hexadecapole, a quadrupole interlaced with a hexapole to provide a decapole, and an octapole interlaced with a quadrupole to provide for a dodecapole; and providing an RF field to radially confine desired said received ions within said first and said second ion channel paths.

27. The method of claim 26, further comprising: providing a DC voltage gradient to induce DC axial forces that act on said received ions so that said received ions can be directed to said end of said resultant multipole ion channel.

28. The method of claim 27, wherein said DC voltage gradient comprises a monotonically increasing or decreasing said DC voltage level along said first and said second ion channel paths.

29. The method of claim 27, wherein said DC voltage gradient comprises a dynamically controlled said DC voltage gradient along said first and said second ion channel paths.

30. The method of claim 26, further comprising: coupling to an end of said resultant multipole ion channel, at least one analyzer selected from: an ion cyclotron resonance (ICR), an orbitrap, a Fourier Transform Mass Spectrometer (FTMS), a quadrupole/ orthogonal acceleration -time of flight (oa-TOF), a linear ion trap-time of flight (LIT-TOF), a linear ion trap (LIT)-orbitrap, a quadrupole-ion cyclotron resonance (ICR), an ion trap-ion cyclotron resonance (IT-ICR), a linear ion trap-off axis-time of flight (LIT-oa-TOF), and a linear ion trap (LIT)-orbitrap mass analyzer.

31. The method of claim 30, further comprising: coupling to an end of either said first and said second ion channel paths, at least one ion source selected from: an Electrospray Ionization Source (ESI), a Nanoelectrospray Ionization source (NanoESI), an Almospheric Pressure Ionization source (API), an electron impact (EI) ionization source, a chemical ionization (CI) source, an EI/CI combination ionization source, a Surface-Enhanced Laser Desorption/Ionization (SELDI) ion source, a Laser Desorption Ionization (LDI) ion source, and a Matrix Assisted Laser Desorption/Ionization (MALDI) ion source.

* * * * *